UNITED STATES PATENT OFFICE.

HENRY B. SLATER, OF RIVERSIDE, CALIFORNIA.

PROCESS OF EXTRACTING ALKALI-METAL COMPOUNDS.

1,197,556.   Specification of Letters Patent.   Patented Sept. 5, 1916.

No Drawing.   Application filed May 16, 1912.   Serial No. 697,821.

*To all whom it may concern:*

Be it known that I, HENRY B. SLATER, a citizen of the United States, residing at Riverside, in the county of Riverside and State of California, have invented certain new and useful Improvements in Processes of Extracting Alkali-Metal Compounds, of which the following is a specification.

This invention relates to a process of extracting alkali metal compounds from minerals and mineral residues containing alkalis.

One object of the invention is to obtain an alkali, particularly potash, from minerals and mineral residues containing alkali compounds.

Another object of the invention is to obtain the alkali referred to, by treating the mineral or mineral residue with a solvent rich in chlorids of higher form, so as to produce the alkali in the form of chlorid.

The invention is applicable to the recovery of potash from feldspar and other minerals containing potash and also to the recovery of potash from mineral residues, such as the flue dust of cement and other works.

I have discovered that potash and like alkalis may be obtained from feldspar and other minerals containing potash and also from the flue dust of cement and other works, by preparing a solvent or lixivient containing a halogen, such as chlorin, as for instance, in the form of a metallic chlorid capable of reduction to a lower chlorid, namely, ferric chlorid; the solvent also containing additional active chlorin compounds produced in the manner hereinafter set forth.

My present process takes advantage, for the stated purposes, of the solvent properties of a leaching solution produced in the manner set forth in U. S. Patent No. 1,066,855, issued to me July 8, 1913, in which such solution was applied to the extraction of such metals as gold, silver and copper from their ores, and especially from ores in which sulfur is present.

I have discovered that by mixing a solution of potassium chlorid or sodium chlorid, with ferrous chlorid, and treating the solution in a manner to be hereinafter described, by electrolysis, substantially as set forth in said previous patent, and adding the solution thus prepared to a finely pulverized mineral containing potash, the potash is dissolved thereby and removed from the other constituents of the mineral, and can then be recovered from the solution by direct or fractional evaporation.

By the electrolysis of an alkali chlorid it is possible, as set forth in my previous patent above referred to, to form higher and more unstable chlorids, which are ready, under properly arranged conditions, to form other chlorids with such elements present as may have an affinity for chlorin, when brought into intimate contact therewith. This principle, set forth in my previous application, is used in this case for the extraction of potash from feldspar or any other mineral containing potash.

In the feldspar group are forms carrying potash, forms carrying soda and forms carrying both potash and soda, and the present invention is herein described as applied to the treatment of the forms carrying potash, or potash and soda. Orthoclase or potash feldspar presents the form $K_2O, Al_2O_3, 6SiO_2$ and leucite, which is allied to the feldspar group presents the form $K_2O, Al_2O_3, 4SiO_2$. Other forms of similar minerals carrying soda, lime, baryta, etc., may be represented by a typical formula as $Al_2O_3, K_2O, nSiO + XO$, in which $n$ denotes any number and X may represent Ca, Ba, $Na_2$, etc. Iron is also often present in many of the minerals of this nature, and I will describe my invention as applied in connection with a mineral or mineral product containing iron. Such product may be for example, a mineral residue of cement and other manufacturing plants in which large quantities of so called flue dust result from the operation of the plants. These flue products may be represented by a typical formula $Al_2O_3, K_2O, nSiO_2 + XO$ or $Xa$ where $n$ is any number, X may represent Ca, Ba, Sr, Ti, Al, etc., and $a$ may represent $SO_4$, $CO_2$, Cl, etc. Taking, for example a flue dust carrying $Al_2O_3$, $SiO_2$, CaO and $K_2O$, mingled with the gaseous products of combustion, generally containing $SO_4$ from the fuel, said dust also often containing iron, we have a mixture suitable for carrying out this process.

In the preparation of the solvent for treating the minerals according to this process, a two-part electrolytic cell is preferably used, such as referred to in my previous application aforesaid. The electrolyzer is provided with an anode and a cathode in separate compartments, the compartments being separated preferably by a non-conducting porous partition. The anode employed may be of carbon or graphite, or other material which is not liable to attack by the products of electrolysis. The cathode is made of a metal, preferably of copper, as the alkaline hydroxid produced at the cathode will not attack the copper during the carrying out of the process and as it offers a low resistance to the electric current.

Since iron is present in many of the materials treated, I will first describe the process of treating the material to take up the iron and produce the leaching solution containing the reducible metallic chlorid. With iron present in the compound to be treated, the first operation should have in view the formation of hydrochloric acid in the anode compartment of the electrolyzer. Both of the compartments of the electrolyzer being charged with a solution of potassium chlorid or of sodium chlorid, and current being passed through the electrolyzer, chlorin is set free at the anode and caustic potash or soda is formed at the cathode, and by suitably carrying out the operation, hydrochloric acid is also produced at the anode compartment, and when sufficient of the acid has been formed, the mixed solution of hydrochloric acid and sodium chlorid is applied to the material to be treated and the iron thereby dissolved to form ferrous chlorid ($FeCl_2$). This solution is then extracted from the mass, and is subjected to treatment in the anode compartment of the electrolyzer until all the iron present in the solution has been raised to the ferric state, which will result from the chlorin liberated from the sodium chlorid in solution combining with the ferrous chlorid ($FeCl_2$) to form ferric chlorid ($Fe_2Cl_6$). This ferric chlorid is of importance as a chlorin carrier for the operations to follow and will be found to contribute largely to their success. As soon as all the ferrous chlorid has been raised to ferric chlorid, I proceed to add, carefully and under regulated conditions, some of the cathode liquor, containing caustic soda, produced by electrolysis of sodium chlorid in the cathode compartment, to the anode liquor in the anode compartment, and as shown in my patent aforesaid, there is produced, by the reaction of the sodium hydroxid with the ferric chlorid, and by the continued electrolysis, generating chlorin in the anode compartment, a solution containing hypochlorous acid as well as ferric chlorid and sodium chlorid. It may also contain sodium chlorate and hydrochloric acid. I then add the solution produced as above described to the material to be treated, with the result that the potash in the material goes into solution as potassium chlorid, by reaction with the chlorin contained in the ferric chlorid and hypochlorous acid. The sodium chlorate and hypochlorous acid, in this reaction, furnish the oxygen for the precipitation of the iron as ferric oxid, which is now in a form to be used again in the formation of ferric chlorid and hypochlorous acid for repetition of the operation, or it may be discarded with the waste after the removal of the potassium chlorid solution.

It will be observed that as we are extracting the potash in the form of a chlorid, a solution of the chlorid of potash can be used for the purpose set forth, in the place of sodium chlorid.

In the case of the mixed chlorids of potash and soda, they can be separated by what is understood as fractional crystallization, in which, as the potash salt is the more soluble, the sodium chlorid will crystallize out and can be removed for further use in the production of chlorin through a continuing cycle of operations. All of the chlorin originally generated can be obtained from sodium chlorid, which is plentiful and inexpensive.

The process is carried out with especial advantage in connection with the flue dust of cement works, which is in the best possible condition for treatment by this process, as it is already in the form of an impalpable powder and therefore does not require pulverizing, but is at once ready for the solvent.

Where iron is not present in the materials treated, it may be placed in the solvent by mixing ferrous chlorid with the sodium chlorid or potassium chlorid, in which case the initial treatment of the material above described will not be necessary.

What I claim is:

1. The method of extracting potash from mineral materials containing the same, which consists in leaching such materials with a solution containing ferric chlorid together with a compound containing chlorin and oxygen in combination.

2. The method of extracting potash from minerals containing potassium and iron, which consists in leaching such mineral with a solution containing hydrochloric acid to form ferrous chlorid, subjecting the resulting solution to electrolysis in the presence of an alkali metal chlorid, to produce ferric chlorid, then adding a metallic hydroxid to the solution and continuing electrolysis to produce hypochlorous acid, and then leaching the mineral with the resulting solution containing ferric chlorid and hypochlorous acid.

3. The method of extracting potash from minerals containing the same, which consists in leaching such mineral with a solution containing ferric chlorid and hypochlorous acid.

4. The method of extracting potash from minerals containing the same, together with iron, which consists in leaching the ore with a solution containing hydrochloric acid, to form ferrous chlorid, subjecting the resulting solution to electrolysis in the presence of sodium chlorid to produce ferric chlorid, and to simultaneously produce a cathode liquor containing sodium hydroxid, then adding some of such cathode liquor to the solution and continuing the electrolysis, to produce hypochlorous acid, and then leaching the mineral with the resulting solution containing ferric chlorid and hypochlorous acid.

In testimony whereof, I have hereunto set my hand, in presence of two witnesses.

HENRY B. SLATER.

Witnesses:
  EDNA B. ROLLINS,
  CASSELL SEVERANCE.